United States Patent [19]

Daniels

[11] Patent Number: 5,704,569
[45] Date of Patent: Jan. 6, 1998

[54] COUNTERBALANCE MECHANISM FOR INWARDLY AND UPWARDLY OPENING PLUG-TYPE AIRPLANE CARGO DOORS

[75] Inventor: Dyrk L. Daniels, Bothell, Wash.

[73] Assignee: The Boeing Company, Seattle, Wash.

[21] Appl. No.: 440,230

[22] Filed: May 12, 1995

[51] Int. Cl.$^6$ ........................................ B64C 1/14
[52] U.S. Cl. .................. 244/129.5; 244/129.4; 74/105; 49/386
[58] Field of Search ............ 244/129.5, 129.4, 244/118.1, 118.3; 74/105, 106; 49/386, 339, 248; 16/1 R, 1 C, 286, 287, 288, 289

[56] References Cited

U.S. PATENT DOCUMENTS

| | | | |
|---|---|---|---|
| 2,808,257 | 10/1957 | Brookbank | 244/129.5 |
| 3,591,111 | 7/1971 | Spence | 244/129.5 |
| 3,718,171 | 2/1973 | Godwin | 244/129.5 |
| 4,447,026 | 5/1984 | Maraghe . | |
| 4,474,348 | 10/1984 | Skotte . | |
| 4,497,462 | 2/1985 | Hamatani . | |
| 4,510,714 | 4/1985 | Kasper et al. . | |
| 4,601,446 | 7/1986 | Opsahl | 49/386 |
| 4,854,010 | 8/1989 | Maraghe et al. . | |
| 5,031,863 | 7/1991 | Noble | 244/129.5 |
| 5,255,876 | 10/1993 | Fleming . | |
| 5,289,615 | 3/1994 | Banks et al. . | |
| 5,383,628 | 1/1995 | Harriehausen et al. | 244/118.1 |

FOREIGN PATENT DOCUMENTS 1103022  2/1968  United Kingdom ............... 16/1

OTHER PUBLICATIONS

Design Guide for Advanced Composites Application, "Design Study 6", date unknown.

*Primary Examiner*—Andres Kashnikow
*Assistant Examiner*—Tien Dinh
*Attorney, Agent, or Firm*—Christensen O'Connor Johnson & Kindness PLLC

[57] ABSTRACT

A counterbalance mechanism (10) counters the weight of a door in an airplane. The door hingedly mounts to the fuselage of the airplane, and rotates upward and inward relative to the fuselage along a hinge axis. The counterbalance mechanism includes a housing (12) for affixing the counterbalance mechanism to the fuselage of the airplane. A guide tube (14) rotatably mounts to the housing for swinging movement about an axis of rotation generally parallel to the hinge axis of the door. The guide tube includes a rod (40) that extends outwardly from the guide tube. Compression springs (34) within the guide tube oppose outward movement of the rod. A linkage assembly that includes a bell crank (50) and a push rod (56) connects the guide tube to the door via rod (40) to assert counterbalancing force during the door opening and closing sequence of the door.

18 Claims, 5 Drawing Sheets

COUNTERBALANCE MECHANISM FOR INWARDLY AND UPWARDLY OPENING PLUG-TYPE AIRPLANE CARGO DOORS

FIELD OF THE INVENTION

The present invention relates generally to doors for airplanes, and in particular, to counterbalance mechanisms for inwardly and upwardly opening plug-type cargo doors for airplanes.

BACKGROUND OF THE INVENTION

Cargo doors for airplanes generally open upwardly, which creates two major drawbacks from the standpoint of design and maintenance. First, the doors are relatively heavy, often making it difficult for personnel to open such a door. Second, once personnel have opened the door, the door may not remain open because of the door's weight.

To at least partially overcome these drawbacks, most airplanes use a counterbalance mechanism to counter the weight of the doors. For example, plug-type cargo doors in one type of airplane use a counterbalance mechanism that includes a spring-tensioned cable and pulley system connected between the door and the airplane fuselage. When the door is opened, the system winds a cable onto a pulley, which pulls the door inward and upward to counteract the weight of the door.

Although satisfactory in many respects, spring-tensioned cable and pulley systems have a disadvantage. Specifically, the cables in these systems fatigue rapidly, and snap unpredictably. To ensure reliable operation, the cables of these systems require frequent inspection and replacement, which is costly.

Attempts have been made to solve the problem of cable fatigue and breakage by using larger cables. However, cable size is constrained by airplane space and weight limitations. Hence, increased cable size has not been found to overcome the disadvantage of cable fatigue and breakage.

The present invention provides an improved solution for counterbalancing the weight of airplane doors.

SUMMARY OF THE INVENTION

The present invention provides a counterbalance mechanism for countering the weight of a plug-type cargo door in an airplane. The door hingedly mounts to the fuselage of the airplane, and rotates upward and inward relative to the fuselage along a hinge axis. The counterbalance mechanism mounts to the structural elements of the ceiling of the airplane, directly inboard of the door. When the door opens, the mechanism counterbalances the weight of the door so that the door readily opens, and remains open.

The counterbalance mechanism includes a housing for affixing the counterbalance mechanism to the ceding of the airplane. A guide tube rotatably mounts to the housing, and has an axis of rotation generally parallel to the hinge axis of the door. The guide tube partially contains a rod, which lies generally along the longitudinal axis of the guide tube and extends outwardly therefrom in a direction towards the airplane door. At least one spring is contained in the guide tube, which is mechanically linked for opposing outward movement of the rod along the longitudinal axis of the guide tube. Spring force in the guide tube supplies a force sufficient to counterbalance the weight of the door as it opens.

A linkage assembly connects the outwardly extending end of the rod to the door for mechanically coupling the spring force to the door. The linkage assembly includes a bell crank mounted for rotation to the housing. The bell crank rotates about an axis substantially parallel to the hinge axis of the door, and includes first and second arms. The first arm rotatably mounts to the outwardly extending end of the rod of the guide tube, and the second arm rotatably mounts to the first end of a push rod. The second end of the push rod is connectable to the airplane door for coupling force from the mechanism to the door.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
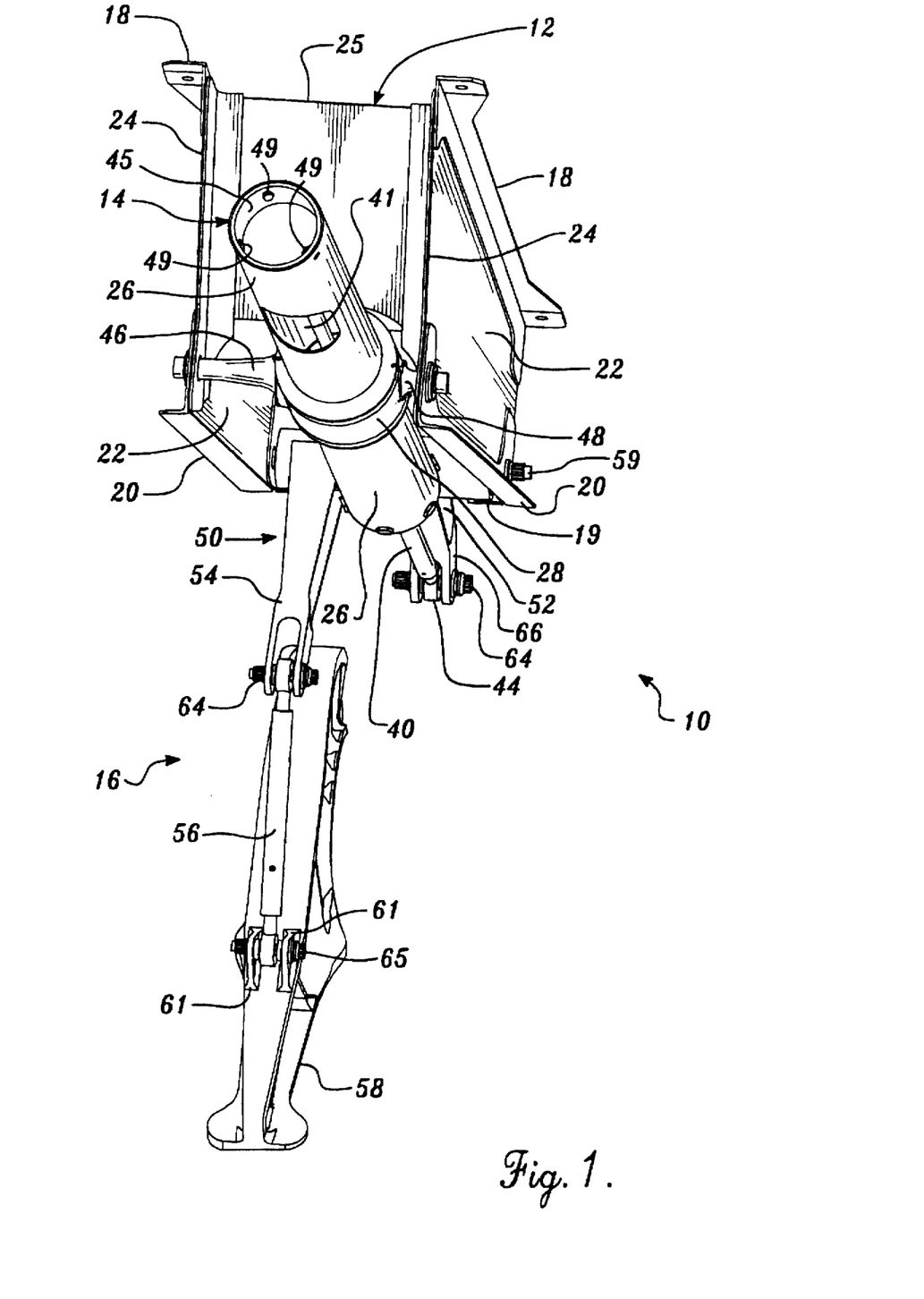
FIG. 1 is a perspective view of a preferred embodiment of a counterbalance mechanism in accordance with the present invention.

FIG. 1 illustrates a preferred embodiment of a counterbalance mechanism 10 constructed in accordance with the present invention, with the mechanism being viewed looking generally in the direction of the door. As is indicated in FIG. 1, the mechanism 10 mounts to the structural elements of the ceiling of an airplane, directly inboard of an inwardly and upwardly opening plug-type cargo door (only the hinge 58 of the door is shown in FIG. 1). When the door opens, the mechanism counterbalances the weight of the door so that the door readily opens, and remains open.

The counterbalance mechanism 10 includes a housing 12 for mounting the mechanism 10 to the ceiling of the fuselage. A guide tube mechanism 14 rotatably mounted to the inboard lower portion of housing 12 supplies sufficient force to counterbalance the weight of the door. A linkage assembly 16, which includes a bell crank 50 and a push rod 56, mechanically couples the force from the guide tube mechanism 14 to the door.

In the preferred embodiment, the housing 12 includes a plurality of beams and metal sheets that are formed of conventional materials such as high-strength, lightweight aluminum or titanium alloys, and/or composite materials. The beams and sheets may be connected to one another by any means known in the art, such as by welding or by using conventional fasteners. In the currently preferred embodiments of the invention, housing 12 is constructed of aluminum structural elements that are fastened to one another.

In the depicted embodiment, the housing 12 includes two beams 18 of substantially L-shaped cross-sectional geometry. As can be seen in FIG. 1, beams 18 are substantially parallel to one another, with one leg of each beam 18 extending along the ceiling of the airplane. Included in the terminal regions of the leg of beam 18 that extends along the airplane ceiling are flanges that include openings for mounting housing 12 to the airplane.

Extending downwardly from the oppositely disposed downwardly extending legs of each beam 18 are side sheets 22. In the currently preferred embodiments of the invention, side sheets 22 are dimensioned and shaped so that the lower inboard corners of the side sheets 22 are below the lower outboard corners of side sheets 22. Upon understanding the invention, it will be recognized that dimensioning and configuring side sheets in the above-indicated manner establishes rotational axes for the guide robe 14 and linkage assembly 16 and, in addition, allows the airplane door to be fully opened and maintained in the open position.

As can best be seen in FIG. 1, housing 12 also includes L-shaped beams 20 that extend longitudinally along the lower edges of side sheets 22. As will be recognized by those skilled in the art, the less of L-shaped beams 20 that extend outwardly from side sheets 22 stiffen and reinforce housing 12. Each end of the leg of L-shaped beam 20 that extends upwardly along a side sheet 22 includes a flanged region. Openings that extend through the flanged regions of L-shaped beams 20 and through side sheets 22 define axes of rotation for guide tube 14, and bell crank 50 of linkage assembly 16. In particular, oppositely disposed openings through flanges of L-shaped beam 20 and side sheets 22 that are positioned in alignment with one another within the inboard lower portion of housing 12 define an axis of rotation for guide tube 14 which is substantially parallel with the axis of rotation of hinge 58. Similarly, aligned openings through the flanges of L-shaped beams 20 and side sheets 22 that are located within the lower outboard portion of housing 12 provide an axis of rotation for bell crank 50 that also is substantially parallel to the rotational axis of hinge 58. As shall be described in more detail hereinafter, rotation of bell crank 50 by guide tube 14 transfers force to hinge 58 in a manner that provides the desired counterbalance for the airplane door.

With continued reference to FIG. 1, housing 12 further includes an end sheet 25 that extends between side sheets 22 at a location that is near the inboard edges of the side sheets. Extending along the fore and aft edges of end sheet 25 are L-shaped beams 24 that join side sheet 24 to the inside faces of side sheets 22. In the depicted arrangement, L-shaped beams 24 extend downwardly beyond the lower edge of end sheet 25 and include openings that are in alignment with the previously described openings of side sheets 22 and L-shaped beams 20 that form the axis of rotation for guide tube 14.

Figure 2:
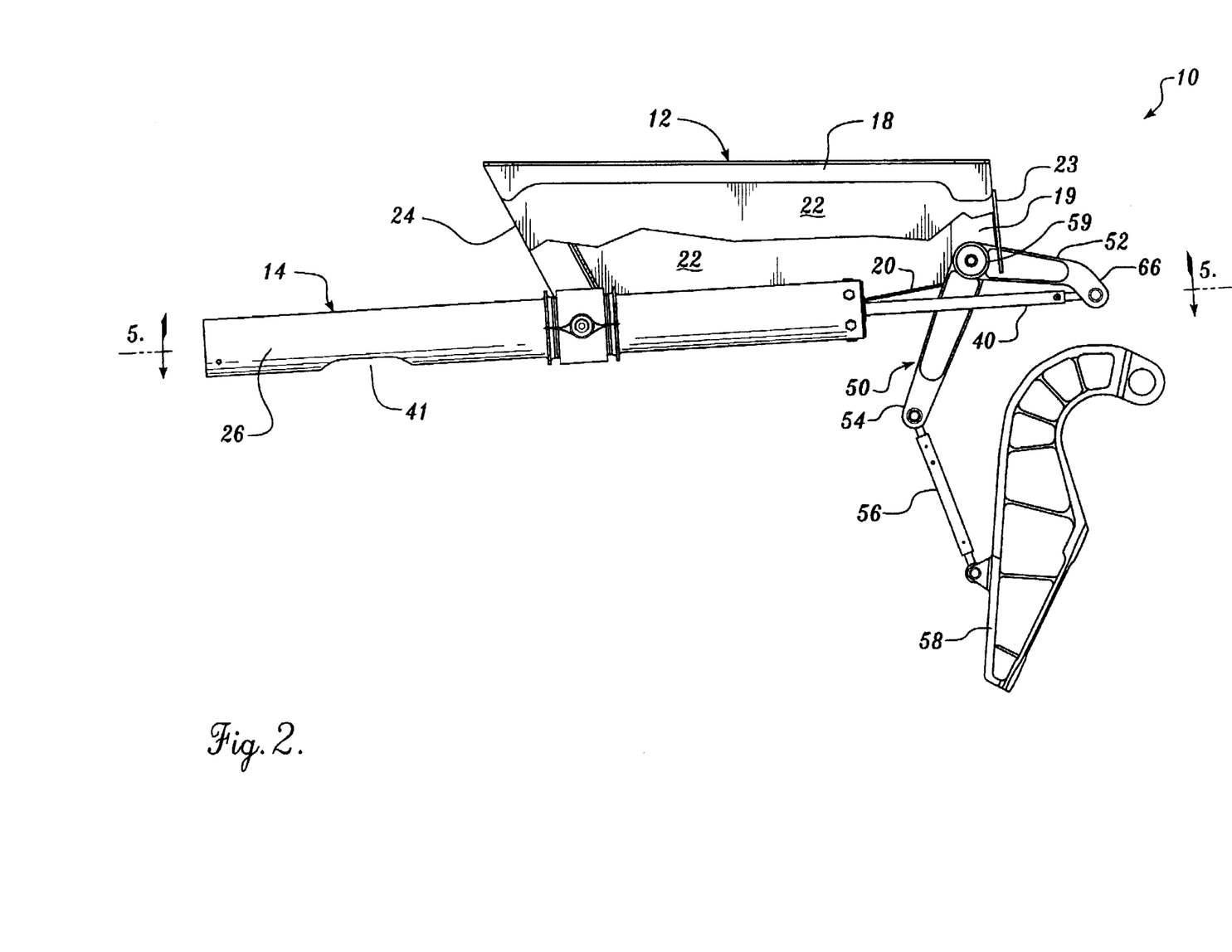
FIGS. 2–4 are side elevational views of the counterbalance mechanism of FIG. 1, with part of the mechanism removed, and with the door being shown in the closed, partially open, and fully open positions, respectively.
Figure 3:
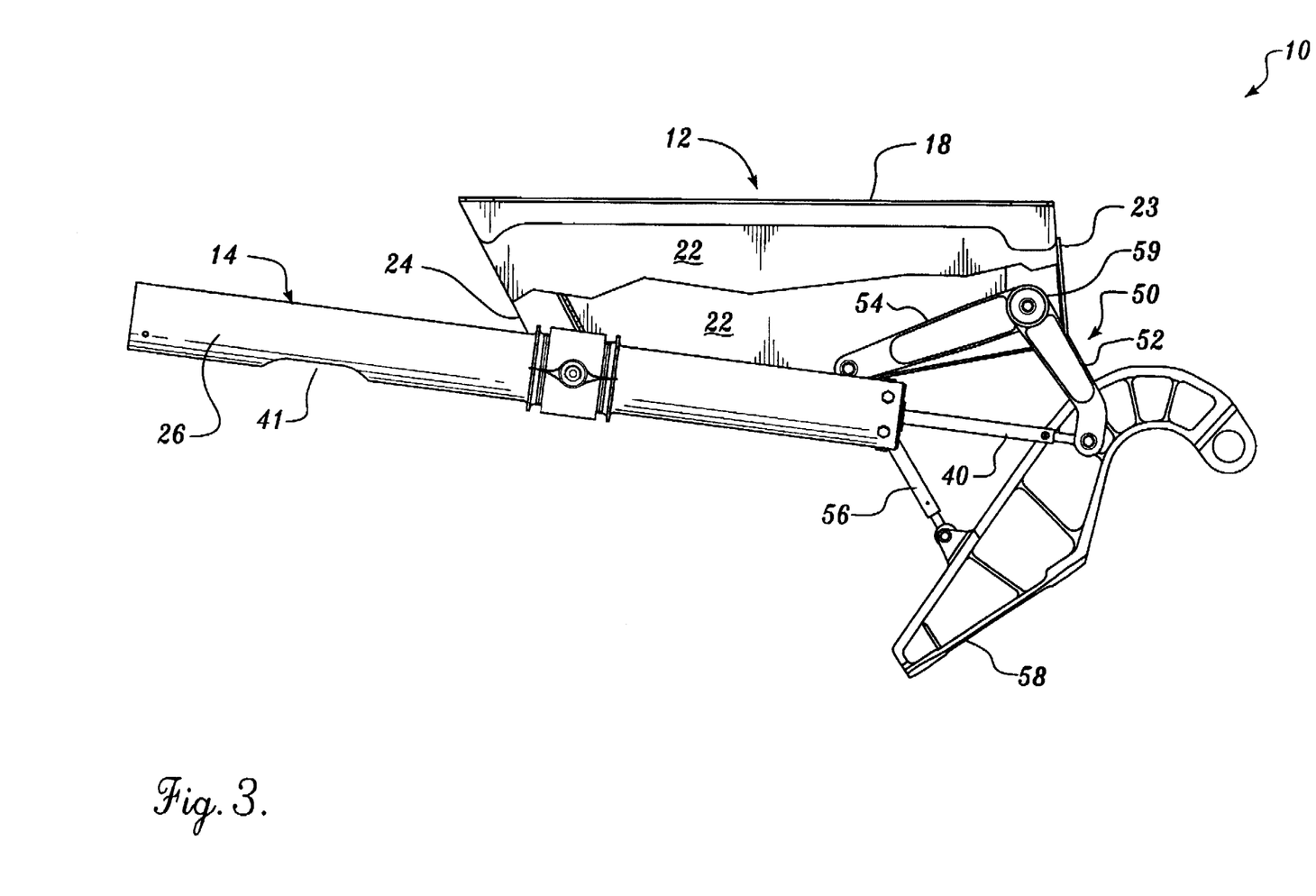
Figure 4:
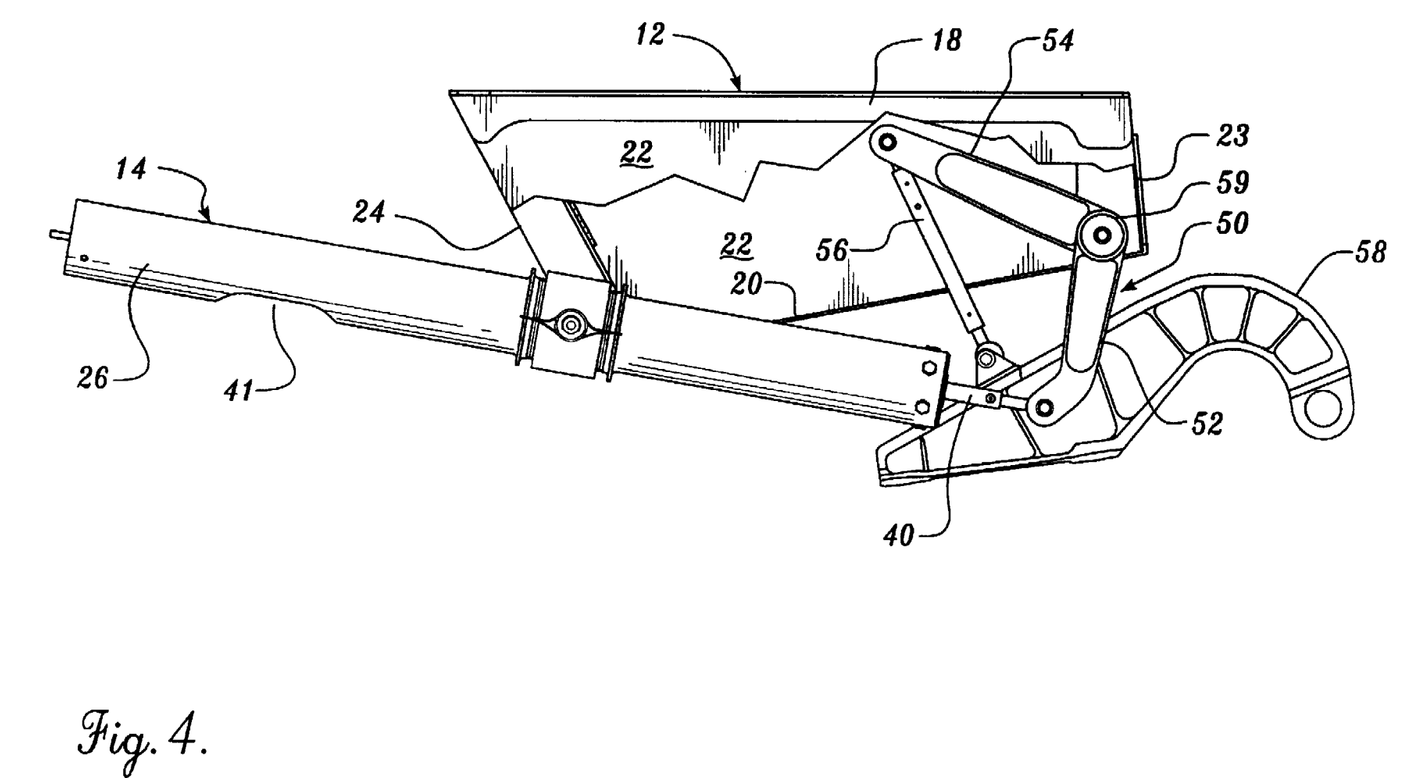

Housing 12 also includes an end sheet 23 that is located near the outboard terminus of side sheets 22 and extends downwardly between the side sheets (see FIGS. 2–4). L-shaped beams 19 extend along the outboard boundary edge of each side sheet 22 with the legs of the L-shaped beams 19 being fastened to or otherwise joining end sheet 23 to side sheets 22. is shown in FIGS., guide tube 14 of the currently preferred embodiment includes a generally cylindrical housing 26 that is formed by a collar 28, an inboard tube 30 and an outboard tube 32. Inboard and outboard tubes 30 and 32 are installed in opposite ends of the threaded opening that extends through collar 28. When joined together in this manner, the inboard and outboard tubes 30 and 32 form a continuous cylindrical passage 33 that extends throughout the length of guide tube 14.

To rotatably mount guide tube 14 to housing 12, collar 28 includes first and second pivot shafts 46 and 48 that extend outwardly from oppositely disposed locations along the outer periphery of collar 28. As can be seen in FIG. 1, pivot shafts 46 and 48 pass through the previously described openings in housing 12 that define an axis of rotation for guide tube 14. In the currently preferred embodiment, the openings include Teflon® coated bushings that rotatably receive pivot shafts 46 and 48.

As also can be seen in FIG. 1, the relative lengths of pivot shafts 46 and 48 are established so that guide tube 14 is positioned adjacent to and in close proximity with one of the side sheets 22 (the forwardmost side sheet 22 in the arrangement of FIG. 1). Mounting guide tube 14 off center in this manner allows one arm of bell crank 50 to pass upwardly past guide tube 14 during the hereinafter described door opening and closing sequence.

Referring again to FIG. 5, a series of four compression springs 34 extend in end-to-end relationship along cylindrical passage 33 of guide tube 14. Spring guides 36 that are slidably received within cylindrical passage 33 are positioned between the ends of springs 34 that are proximate one another. Both faces of each spring guide 36 include a circular recess that is dimensioned for receiving the end of an adjacent compression spring 34 and for maintaining the springs 34 centered within cylindrical passage 33. Located at the proximate and distal end of the end-to-end series of compression springs 34 is an endcap 38. Each endcap 38 is slidably received within cylindrical passage 33 with the face of the endcap 38 that adjoins a compression spring 34 including a recess for receiving the spring and maintaining the end of the spring centered within cylindrical passage 33. The opposite face of each endcap 38 is flat, with the flat surface of the endcap 38 that is located within inboard tube 30 being in abutment with a spool 42 and the endcap 38 that is located in outboard tube 32 being in abutment with a retainer 39.

Figure 5:
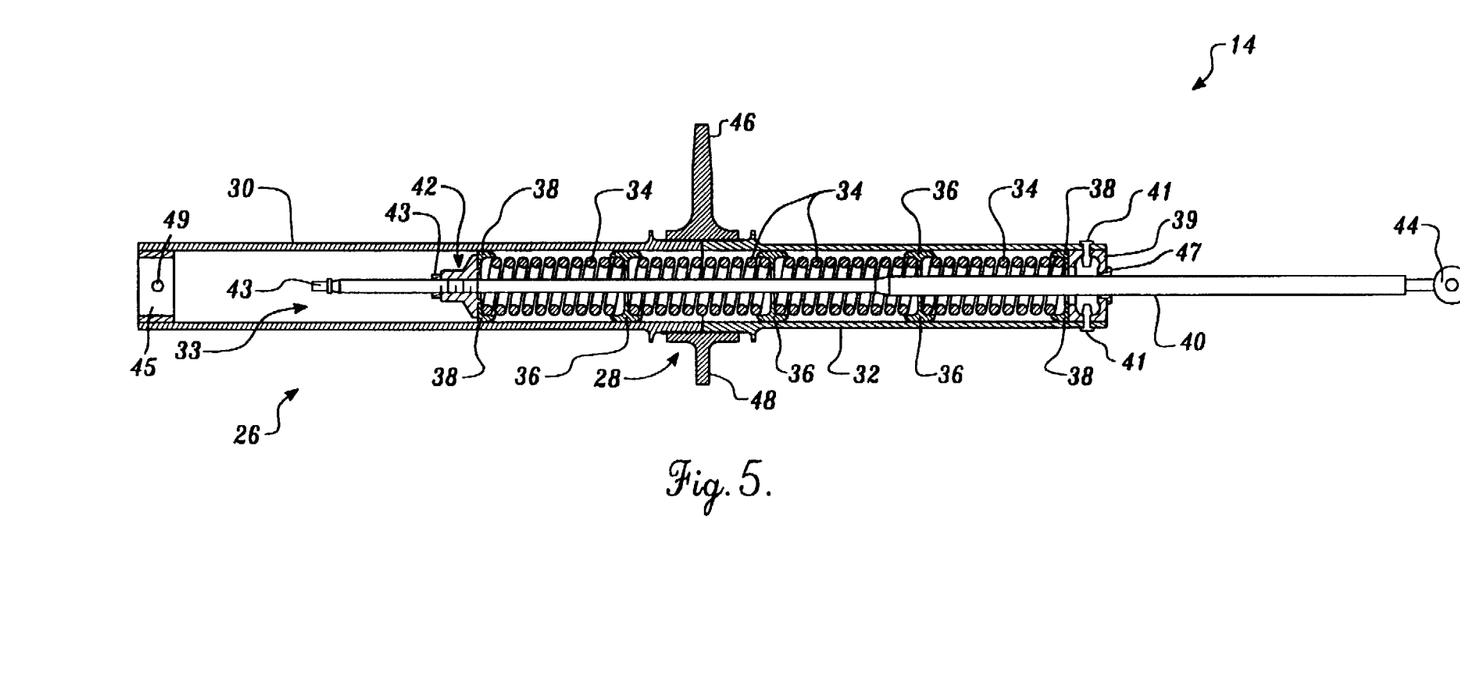
FIG. 5 is cross-sectional view of the guide tube of the mechanism of FIG. 1 taken along section line 5—5 shown in FIG. 2.

The face of spool 42 that abuts endcap 38 is circular in geometry, having a diameter that is slightly less than the diameter of cylindrical passage 33. When viewed in longitudinal cross section (as shown in FIG. 5), the diameter of spool 42 decreases as a function of distance from the face that abuts endcap 38 to form a flat face at the inboard end of spool 42 that is smaller in diameter than the face of the spool that abuts endcap 38. Extending axially through the center of spool 42 is a circular opening for passage of a rod 40 that passes along the axial center line of circular passage 33 and outwardly from the outboard end of guide tube 14. The inboard end of rod 40 (the end furthest from the door) is threaded. Engaged with the threaded portion of rod 40 that projects beyond spool 42 is a nut 43 that allows adjustment of the distance that rod 40 projects beyond the outboard end of guide tube 14. The end of spool 42 adjacent nut 43 includes a recess that partially contains the nut to reduce bending moments that may be applied to the threads of rod 40. An opening 41 (shown in FIGS. 1–4) allows access to nut 43. As shall be recognized upon understanding the manner in which guide tube 14 is interconnected with linkage assembly 16 and door hinge 58, rotation of nut 43 controls the extent to which springs 34 are compressed which, in turn, establishes the force asserted by the counterbalance mechanism.

Bolted in the inboard end of inboard tube 30 is a spring stop 45 for safety considerations. Spring stop 45 is in the form of a hollow cylindrical segment, retained in the inboard end of inboard tube 30 by three evenly spaced circumferential bolts 49 (see FIG. 1). In the event rod 40 breaks, spring stop 45 and bolts 49 prevent spool 43 from exiting through the inboard end of the inboard tube 30. Specifically, the diameter of the spool 42 is too large to pass through spring stop 45. In the currently preferred embodiment, spring stop 45 is made of polyacetyl nylon, and includes a split along the length of the spring stop for thermal expansion and contraction.

As previously mentioned, the endcap 38 that is located in outboard tube 32 is in abutment with a retainer 39. As can be seen in FIG. 5, retainer 39 is plug-like in geometry, having an outer diameter that closely matches the diameter of cylindrical passage 33. Retainer 39 is positioned within passage 38 at the terminus of outboard tube 32 (and hence the outboard end of guide tube 14). Bolts, rivets, or other conventional fasteners (41 in FIG. 5) extend through the wall of outboard tube 32 at circumferentially spaced-apart locations to securely join retainer 39 to outboard tube 32. A longitudinally extending central opening in retainer 39 allows passage of rod 40, with a Teflon® coated bushing 47 that is located in the central opening of retainer 39, providing a bearing surface for rod 40. Endcaps 38 and spring guides 36 preferably are constructed from material such as polyacetyl nylon, or other material having a low coefficient of friction, to thereby allow springs 34 and rod 40 to move freely along and through cylindrical passage 33.

Extending outwardly from the end of rod 40 is an eye bolt 44, which is used to interconnect guide tube 14 with linkage assembly 16. More specifically, as can be seen in FIGS. 2-4, the end of rod 40 that includes eye bolt 44 passes into the distal end of a first arm 52 of the previously mentioned bell crank 50. As can best be seen in FIG. 1, the distal end of arm 52 includes spaced-apart flange regions. A pin 64 extending through the flanged regions and the central opening of eye bolt 44 rotatably interconnects rod 40 (and hence guide tube 14) with bell crank 50.

As previously described, bell crank 50 is mounted for rotation about an axis that is substantially parallel to the axis of rotation of door hinge 58 and is defined by openings that pass through beams 18 and 19 and side sheets 22 within the lower outboard region of housing 12. As can be seen in FIG. 1, a shaft or pin 59 passes through the specified openings and through an opening along the axis of rotation of bell crank 50. As also can be seen in FIG. 1, the second arm 54 of bell crank 50 is offset from first arm 52, with arms 52 and 54 being joined by a cylindrical section (not shown in FIG. 1) that extends between the two arms. The offset between arms 52 and 54 positions arm 52 closely adjacent the inner surface of the forward side sheet 22 and positions arm 54 closely adjacent the inner surface of the aft side sheet 22. Thus, the arms 52 and 54 are not coplanar with one another.

As previously mentioned, locating arm 54 closely adjacent the aft side sheet 22 allows arm 54 of bell crank 50 to pass upwardly beyond guide tube 14 during the door opening and closing sequences. Since the offset of arms 52 and 54 subject bell crank 50 to eccentric loading and relatively high stress, the bell crank preferably is formed of high-strength material. For example, in the currently preferred embodiment, bell crank 50 is a cast hot-isostatically pressed titanium alloy. Also in this regard, rod 40, springs 34, and the nut 43 at the inboard end of the rod are all formed of a titanium alloy in the currently preferred embodiment for high strength.

Rotatably mounted to the outer end of arm 54 of bell crank 50 is a push rod 56. Specifically, and as is best shown in FIG. 1, one end of push rod 56 extends into a yoke-like end region of arm 54 that is formed by two spaced apart flanges. A pin extends through the flanges of arm 54 and through an opening formed in the end of push rod 56. The opposite end of push rod 56 is pivotably attached to hinge 58 in a similar manner. Specifically, hinge 58 includes two spaced apart flanges 61 that are positioned for receiving the distal end of push rod 56. A pin 65 extends through the flanges and through an opening in the distal end of push rod 56 to pivotably interconnect push rod 56 with hinge 58.

Operation of counterbalance mechanism 10 when the airplane door is moved between the closed and open positions is indicated by FIGS. 2-4.

As is shown in FIG. 2, when the airplane door is closed, door hinge 58 is rotated to a position that places push rod 56 under tension. The tension in push rod 56 causes bell crank 50 to be swung into a position that fully extends rod 40 of guide tube 14. With rod 40 fully extended, springs 34 are compressed (loaded) to an extent that is determined by the adjustment (setting) of the nut 43 that is engaged with the threaded section of rod 40 (shown in FIG. 5). Since interaction between guide tube 14, bell crank 50 and push rod 56 urges door hinge 58 toward the door open position, a counterbalancing force thus will be asserted when the door is swung inwardly and upwardly toward an open position.

As is shown in FIG. 3, as the door is part-way between the closed and open position, springs 34 urge rod 40 inwardly along cylindrical passage 33 of guide tube 14. The inward movement of rod 40 causes the distal end of the first arm 52 of bell crank 50 to be moved toward guide tube 14, in turn, which causes bell crank 50 to be swung downwardly (i.e., clockwise in FIG. 3). Rotation of bell crank 50 pulls push rod 56 upward thereby urging the airplane door upward about the hinge axis of hinge 58.

When the door is fully opened as shown in FIG. 4, rod 40 is in its fully retracted position (spool 43 of guide tube 14 is against stops 45). When rod 40 is in its fully retracted position, springs 34 preferably remain under compression sufficient to maintain the aircraft door in the open position.

It can be noted that both arm 54 and push rod 56 pass upwardly into housing 12 as the airplane door moves into a fully open position. This "folding" minimizes the space required for counterbalance mechanism 10 and permits the invention to be employed in situations in which the airplane door is closely proximate the adjoining ceiling area when the door is fully opened.

While the preferred embodiment of the invention has been illustrated and described, it will be appreciated that various changes can be made therein without departing from the spirit and scope of the invention. For example, the mechanism could include spaced apart bell cranks, with the rod mounting centrally therebetween in an alternative embodiment to avoid eccentric loading conditions. In another modification, the housing 12 could simply comprise a framework and not include metal sheets. Further, the mechanism could include a damper to avoid opening and/or closing the door too rapidly. In view of these and other alterations, substitutions and modifications that could be made by one of ordinary skill in the art, it is intended that the scope of letters patent granted hereon be limited only by the definitions of the appended claims.

The embodiments of the invention in which an exclusive property or privilege is claimed are defined as follows:

1. A counterbalance mechanism for countering the weight of a door in an airplane, the door being mounted to the fuselage of the airplane and being opened by upward and inward rotation about a hinge axis that extends longitudinally relative to the airplane, the counterbalance mechanism comprising:

(a) a housing for connection to the airplane;

(b) a guide tube rotatably mounted to the housing and extending toward the door, the axis of rotation of the guide tube being generally parallel to the hinge axis of the door, the axis of rotation of the guide tube being located at a position along the guide tube that allows a portion of each end of the guide tube to rotate about the axis of rotation, the guide tube thereby being capable of engaging in a rocking motion; the guide tube including:

(i) a rod being partially contained by the guide tube and having an end extending outwardly from the guide tube in a direction towards the airplane door; and (ii) at least one spring contained in the guide tube and mechanically linked to the rod for urging the rod into a retracted position within the guide tube; and (c) linkage means for connecting the outwardly extending end of the rod to the door.

2. The counterbalance mechanism of claim 1, wherein the linkage means comprises a bell crank mounted for rotation to the housing with the rotational axis of the bell crank being substantially parallel to the hinge axis of the door.

3. The counterbalance mechanism of claim 2, wherein the linkage means further comprises a push rod having a first end connected to the bell crank, and a second end for connection to the door.

4. The counterbalance mechanism of claim 2, wherein the bell crank is formed from a cast, hot-isostatically pressed titanium alloy.

5. The counterbalance mechanism of claim 2, wherein the guide tube includes a plurality of springs.

6. The counterbalance mechanism of claim 5, wherein the springs are axially aligned with one another in the guide tube.

7. The counterbalance mechanism of claim 2, wherein the bell crank includes first and second arms, wherein the first and second arms are not coplanar with one another.

8. The counterbalance mechanism of claim 7, wherein the bell crank includes a mounting section located between the first and second arms, which is rotatably mounted to the housing.

9. A counterbalance mechanism for countering the weight of a door in an airplane, the door being hingedly mounted to the fuselage of the airplane, wherein the door rotates upward and inward relative to the fuselage along a hinge axis, the counterbalance mechanism comprising:

(a) a guide tube rotatably connected to the fuselage and extending toward the door, the axis of rotation of the guide tube being located approximately mid-length along the guide tube and generally parallel to the hinge axis of the door, the guide tube including:

(i) a rod extending outwardly from the guide tube in a direction that is toward the airplane door, with the rod passing generally along the longitudinal axis of the guide tube and being partially contained by the guide tube; and (ii) at least one spring contained in the guide tube and mechanically linked for opposing outward movement of the rod along the longitudinal axis of the guide tube; and (b) a linkage assembly including:

(i) a bell crank having first and second arms, the first arm of the bell crank being connected to the rod of the guide tube; and (ii) a push rod having first and second ends, the first end being connected to the second arm of the bell crank, and the second end being for connection to the door.

10. The counterbalance mechanism of claim 9, further comprising a housing for connecting the guide tube to the aircraft, the guide tube axis of rotation being located at the housing.

11. The counterbalance mechanism of claim 10, wherein the bell crank includes a section between the first and second arms, which rotatably mounts to the housing.

12. The counterbalance mechanism of claim 11, wherein the axis of rotation of the bell crank is generally parallel to the hinge axis of the door when the housing is affixed to the fuselage of the airplane.

13. The counterbalance mechanism of claim 10, wherein the guide tube is rotatably mounted to the housing.

14. The counterbalance mechanism of claim 13, wherein the axis of rotation of the guide tube is generally parallel to the hinge axis of the door when the housing is affixed to the fuselage of the aircraft.

15. The counterbalance mechanism of claim 9, wherein the guide tube includes a plurality of springs.

16. The counterbalance mechanism of claim 15, wherein the springs are axially aligned with one another in the guide tube.

17. The counterbalance mechanism of claim 9, wherein the bell crank is formed from a cast, hot-isostatically pressed titanium ahoy.

18. The counterbalance mechanism of claim 9, wherein the first and second arms of the bell crank are not coplanar with one another.

* * * * *

UNITED STATES PATENT AND TRADEMARK OFFICE
CERTIFICATE OF CORRECTION

PATENT NO. : 5,704,569
DATED : January 6, 1998
INVENTOR(S) : D.L. Daniels

It is certified that error appears in the above-indentified patent and that said Letters Patent is hereby corrected as shown below:

COLUMN    LINE

8    38    "ahoy." should read --alloy.--
(Claim 17, line 3)

Signed and Sealed this

Thirty-first Day of March, 1998

Attest:

BRUCE LEHMAN

Attesting Officer    *Commissioner of Patents and Trademarks*